United States Patent [19]

Matsuyama et al.

[11] Patent Number: 5,319,961
[45] Date of Patent: Jun. 14, 1994

[54] CANTILEVER CHIP FOR USE IN SCANNING PROBE MICROSCOPE

[75] Inventors: Katsuhiro Matsuyama; Akitoshi Toda, both of Tokyo, Japan

[73] Assignee: Olympus Optical Co., Ltd., Tokyo, Japan

[21] Appl. No.: 941,401

[22] Filed: Sep. 8, 1992

[30] Foreign Application Priority Data

Sep. 17, 1991 [JP] Japan .................................. 3-236561
Jun. 30, 1992 [JP] Japan .................................. 4-172606

[51] Int. Cl.$^5$ .............................................. G01B 5/28
[52] U.S. Cl. ..................................................... 73/105
[58] Field of Search ............... 73/105, 866.5; 250/306, 250/307

[56] References Cited

U.S. PATENT DOCUMENTS 4,668,865  5/1987  Gimzewski et al. ............ 250/306

OTHER PUBLICATIONS

Microfabrication of Cantilever Styli for the Atomic Force Microscope; Albrecht et al.; J. Vac. Sci. Technol. A8(4), Jul./Aug. 1990; pp. 3386–3396.

Primary Examiner—Robert Raevis
Attorney, Agent, or Firm—Frishauf, Holtz, Goodman & Woodward

[57] ABSTRACT

A cantilever chip has a hold substrate and a film member bonded to the substrate. The film member has a rectangular cantilever portion and a triangular cantilever portion having an inner portion removed. These portions are formed by patterning. Each of the portions has an end fixed to the hold substrate, and a free end provided with a probe. The film member has an alignment end used as a mark to determine the position of the side end face of the hold substrate at the time of the film being bonded to the substrate. The alignment end is divided by notches into the cantilever portions.

12 Claims, 14 Drawing Sheets

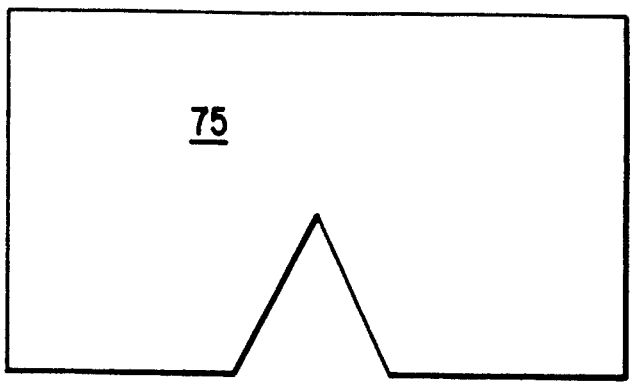
F I G. 16
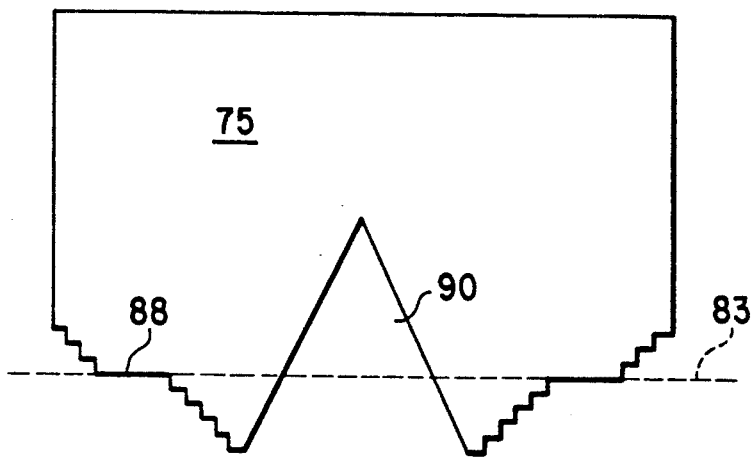
F I G. 17
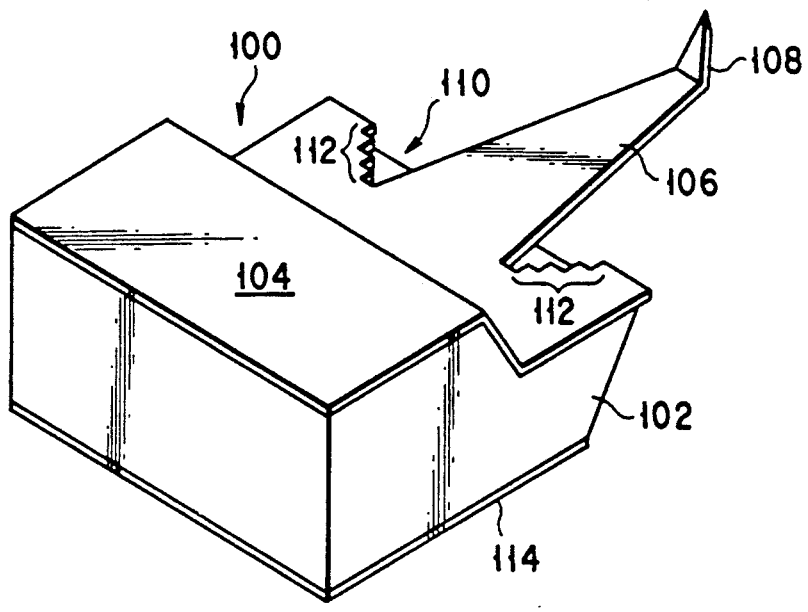
F I G. 18

CANTILEVER CHIP FOR USE IN SCANNING PROBE MICROSCOPE

BACKGROUND OF THE INVENTION

1. Field of the Invention

This invention relates to a cantilever chip for use in a scanning probe microscope.

2. Description of the Related Art

An Atomic Force Microscope (AFM) has been proposed and put to practical use, as a microscope which utilizes a technique such as a servo technique for use in a Scanning Tunneling Microscope (STM) invented by Bennig, Roller, etc., in order to measure, with atomic-order accuracy, an insulating sample which is difficult to measure by means of the STM.

The AFM has a structure similar to the STM, and is categorized as a scanning probe microscope. In the AFM, a cantilever having a free end provided with a sharp projection (probe portion) is made to approach a sample, and the probe portion is moved along the sample, thereby electrically and optically measuring displacement of the cantilever due to interaction between an atom at the tip of the probe portion and an atom on the surface of the sample. Data relating to each point of the sample surface is obtained and processed in time sequence, thus obtaining three-dimensional data as to unevenness of the sample surface, etc.

Since an $SiO_2$ cantilever chip made as a result of application of a semiconductor IC manufacturing process was proposed in Japanese Application, Physics, 62(1987)2599, "Atomic Resolution Imaging of a Nonconductor by Atomic Force Microscope" (invented by Thomas R. Albrecht and Calvin F. Quate), it has been considered that a cantilever obtained by utilizing such a process is suitable for use as a scanning probe microscope cantilever, because it can be made with micron-order accuracy so as to have high image reproductivity, and can be manufactured at low cost by way of a batch process.

For example, a cantilever formed by a silicon nitride film in place of a silicon oxide film is available in the market. This cantilever has a length of 50 to 200 μm, a thickness of 0.5 to 1 μm, and in the shape of a triangle or rectangle having an inner portion removed. Further, the cantilever has characteristics such as a spring constant of 1 to 0.1N/m, and a resonance frequency of 10 to 50 kHz. The spring constant k and a resonance frequency ω are given by the following equations:

$$k = Et^3 w/4L^3 \quad (1)$$

$$\omega = 0.162(E/\rho)^{\frac{1}{2}} t/L^2 \quad (2)$$

where E represents Young's modulus, t the thickness of a cantilever, L the length of the same, and $\rho$ the density of the same.

FIGS. 22 to 28 show an example of a cantilever chip made as a result of application of a semiconductor IC manufacturing process. As is shown in the figures, the cantilever chip has a triangular cantilever portion 202 having an inner portion removed, and a probe 212 provided on a tip portion of the cantilever portion 202. The cantilever chip is made by forming a silicon nitride film of a predetermined shape to provide a cantilever portion 202 and a support portion 204, and then attaching the support portion 204 to a hold substrate 206. It is preferable that the alignment end 208 of the support portion 204 be aligned with the side end face 210 of the hold substrate 206, as shown in FIGS. 22 and 23. Actually, however, there is a strong possibility of a cantilever chip being produced in which the alignment end 208 is not aligned with the side end face 210, as shown in FIGS. 24 to 27. Although in the case shown in FIGS. 24 and 25, the cantilever portion 202 is relatively short, the characteristics of the cantilever chip are substantially identical to those of the chip shown in FIGS. 22 and 23. On the other hand, in the case shown in FIGS. 26 and 27, a portion 204a projecting from the side end face 210 of the hold substrate 206 greatly affects the cantilever chip, thereby making its characteristics differ from the desired ones of the cantilever chip shown in FIGS. 22 and 23. Accordingly, such a cantilever as shown in FIGS. 26 and 27 cannot be put to practical use.

In addition, a cantilever chip produced in the above-described process generally has a plurality of cantilever portions, and is used at the time of measurement, with unneeded cantilever portions broken off. In the cantilever chip of FIGS. 26 and 27, a cantilever portion 202B to be used for measurement may be cracked, as indicated by the one-dot-chain line in FIG. 28, when an unneeded cantilever portion 202A is broken off. In the worst case, all the cantilever portions may be broken off from the side end face 210 of the hold substrate.

SUMMARY OF THE INVENTION

It is an object of the invention to provide a cantilever chip of stable characteristics through minimizing variations in the characteristics of a cantilever portion due to the alignment end of a support portion not being aligned with the side end face of a hold substrate.

It is another object of the invention to provide a cantilever chip wherein unneeded cantilever portions can be broken off without adversely affecting a cantilever portion to be used for measurement.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 16 shows the shape of an opening formed in a resist layer in a step shown in FIG. 15D;

FIG. 17 shows the shape of an opening formed in a resist layer in the step shown in FIG. 15D, so as to manufacture the cantilever chip of FIG. 12;

FIG. 18 shows a cantilever chip according to a fourth embodiment of the invention;

DETAILED DESCRIPTION OF THE PREFERRED EMBODIMENTS

The embodiments of the invention will be explained with reference to the accompanying drawings.

Figure 1:
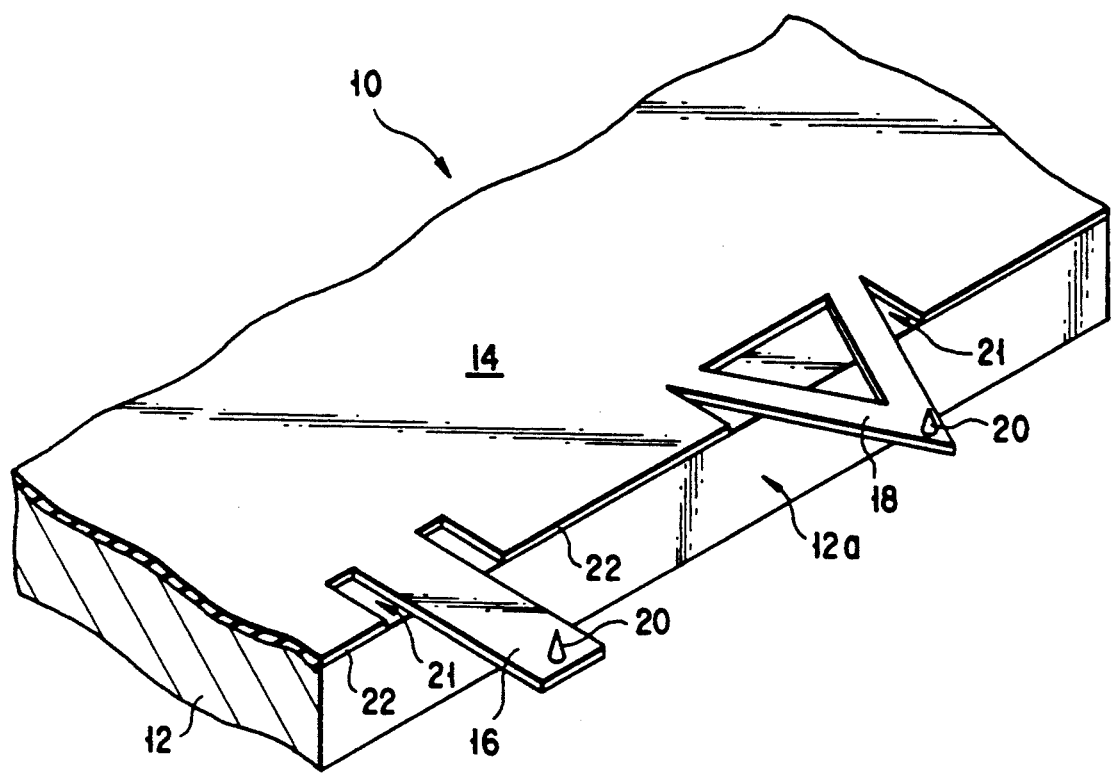
FIG. 1 shows a cantilever chip according to a first embodiment of the invention.

First, a first embodiment will be described referring to related drawings. In this embodiment, the invention is applied to a cantilever chip produced by a micro-casting method. This method provides a cantilever chip having a plurality of cantilever portions. FIG. 1 shows part of such a cantilever chip, including two cantilever portions. As is shown in FIG. 1, a cantilever chip 10 has a hold substrate 12 and a film member 14 attached to the substrate 12. The film member 14 has a rectangular cantilever portion 16 and a triangular cantilever portion 18 having its inner portion punched out. Each of the cantilever portions 16 and 18 has an end fixed to the hold substrate 12, and a free end provided with a probe portion 20. The film member 14 also has an alignment end 22 used as a reference end when it is aligned with the side end face 12a of the hold substrate 12, thereby being attached thereto. The alignment end 22 has notches 21 defining the cantilever portions 16 and 18.

A method of manufacturing the cantilever chip of FIG. 1 will be explained with reference to FIGS. 2A to 2J.

Figure 2A:
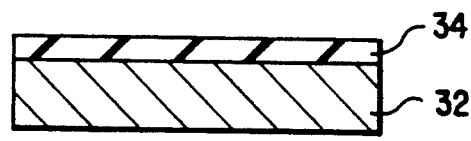
FIGS. 2A to 2J are views, useful in explaining a method of manufacturing the cantilever chip of FIG. 1.
Figure 2B:
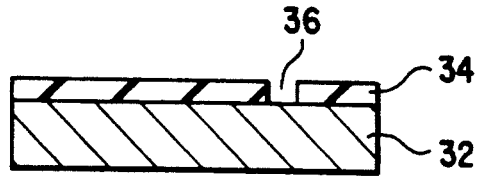
Figure 2C:
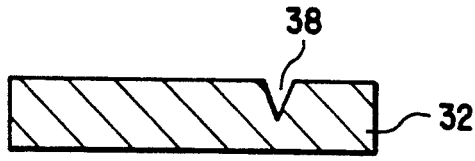
Figure 2D:
Figure 2E:
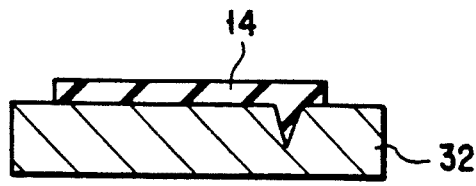
Figure 2F:
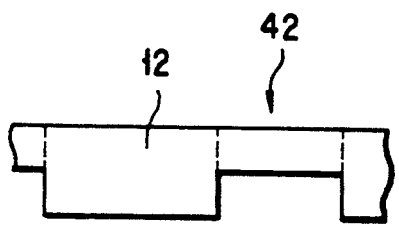
Figure 2G:
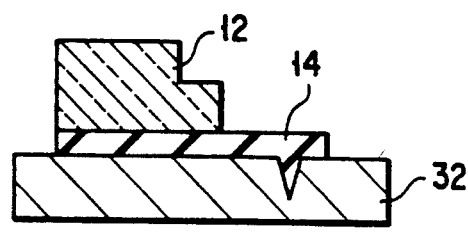
Figure 2H:
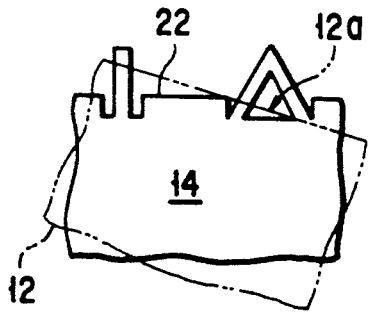
Figure 2I:
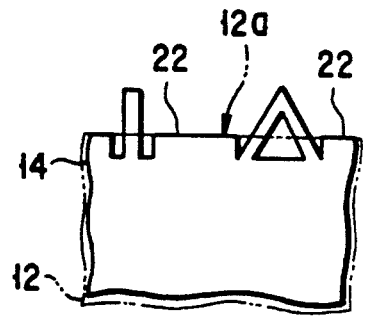
Figure 2J:
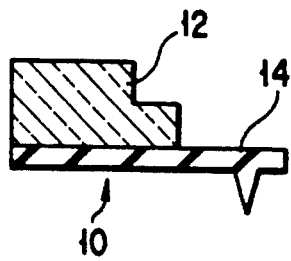

First, a silicon nitride film 34 is formed on a silicon wafer 32 by the CVD method (FIG. 2A). Then, the film 34 is patterned such that it has an opening 36 in a predetermined portion (in which a probe portion is formed), as is shown in FIG. 2B. Subsequently, a substantially conical hole 38 is formed in the silicon wafer 32 by etching the wafer 32 with the film 34 used as a mask, and then the film 34 is removed (FIG. 2C). Thereafter, a silicon nitride film 40 having a thickness of 0.4 to 1 μm is formed on the silicon wafer 32 by the CVD method (FIG. 2D). The silicon nitride film 40 is patterned to form the film member 14 shown in FIG. 1 (FIG. 2E). Then, a pyrex glass 42 is treated to accord with the pattern of the film member 14, thereby forming a hold substrate 12 (FIG. 2F). The hold substrate 12 is attached to the film member 14 by anode bonding (FIG. 2G). To accurately position the substrate 12 and member 14, the substrate 12 is placed on the member 14 (FIG. 2H), and then the side end face 12a of the substrate 12 is aligned with the alignment end 22 of the member 14 (FIG. 2I). Finally, the silicon wafer 32 is removed by etching in a 40% aqueous solution of KOH, thereby obtaining the cantilever chip 10 (FIG. 2J).

Figure 3:
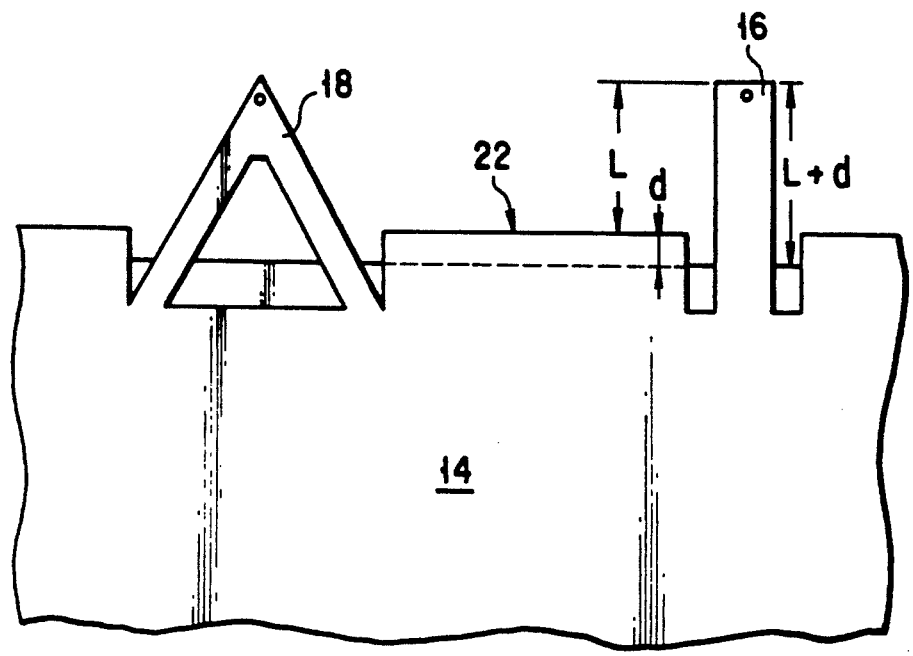
FIG. 3 is a plan view, showing an occasion where a cantilever portion of the cantilever chip of FIG. 1 is displaced in a direction in which it is lengthened.
Figure 4:
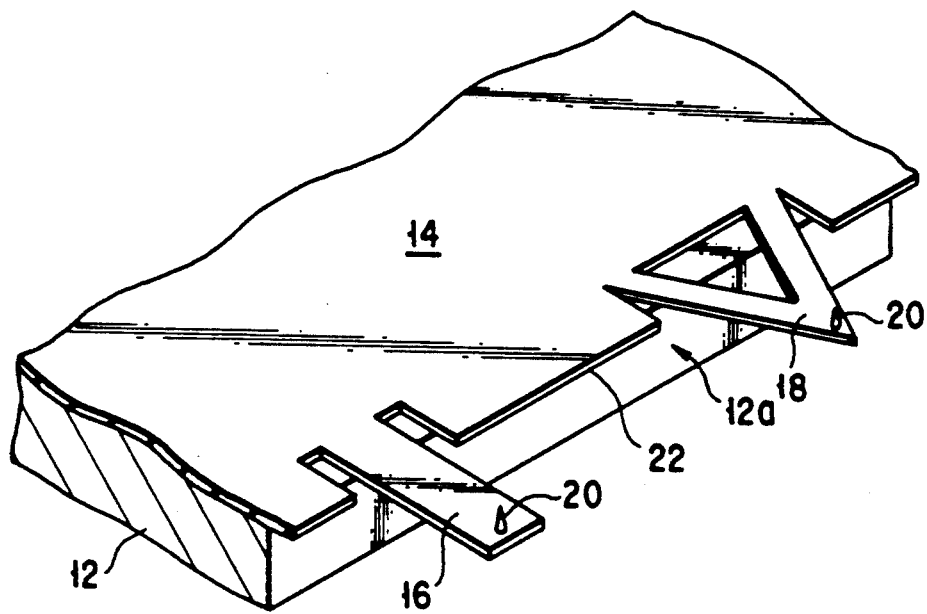
FIG. 4 is a perspective view of the cantilever chip of FIG. 3.
Figure 5:
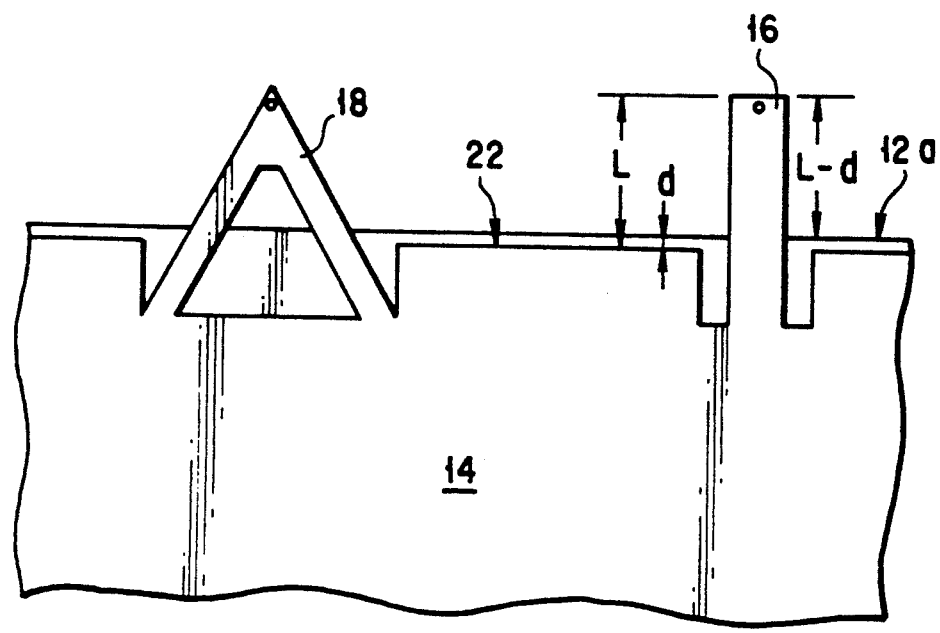
FIG. 5 is a plan view, showing an occasion where a cantilever portion of the cantilever chip of FIG. 1 is displaced in a direction in which it is shortened.
Figure 6:
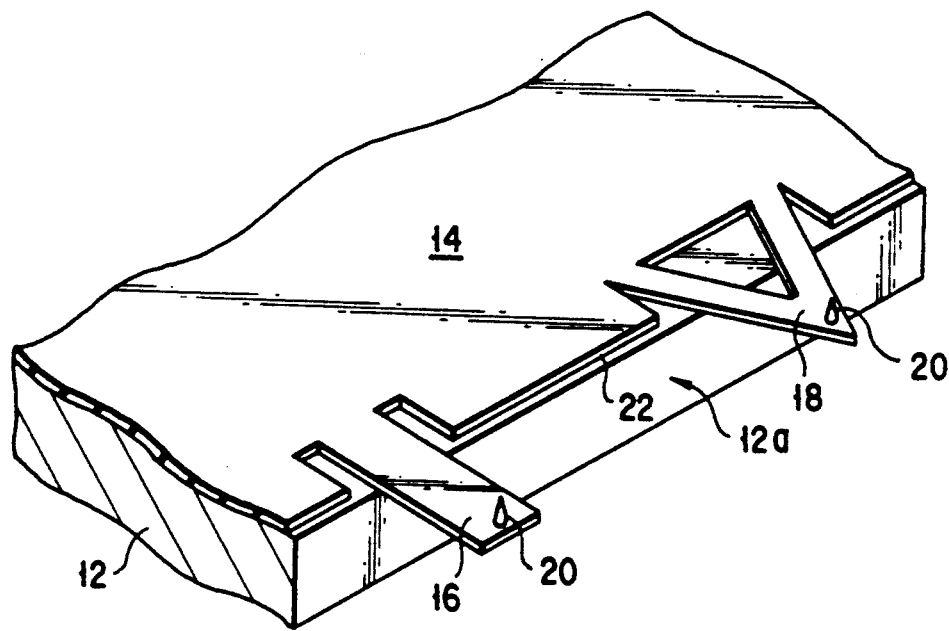
FIG. 6 is a perspective view of the cantilever chip of FIG. 5.

In general, there is possibility of occurrence of an error in positioning at the time of anode bonding of the hold substrate 12 and member 14. Thus, the side end face 12a of the substrate 12 may be slightly misaligned with the alignment end 22 of the film member 14. A cantilever having such a misalignment is shown in FIGS. 3 to 6. FIGS. 3 and 4 are plan and perspective views of the cantilever chip 10, showing a case where the side end face 12a of the hold substrate 12 is retreated from the alignment end 22 of the film member 14 to the side of the fixed end of the cantilever portion. On the other hand, FIGS. 5 and 6 are plan and perspective views of the cantilever chip 10, showing a case where the side end face 12a of the hold substrate 12 projects from the alignment end 22 of the film member 14 to the side of the free end of the cantilever portion. As is evident from these figures, even when the hold substrate 12 is not aligned with the film member 14 at the time of anode bonding, the shapes of the cantilever portions 16 and 18 remain unchanged, though the lengths thereof are changed. That is, the cantilever portion 16 remains rectangular irrespective of the change of length. Similarly, the other portion 18 remains triangular irrespective of the change of length. Accordingly, those changes of the spring constant and resonance frequency of each cantilever portion, which will arise as a result of an alignment error, can be minimized. Also, since the shape of the cantilever portion is not changed basically, the spring constant and resonance frequency can be adjusted easily. For example, suppose that the distance between the side end face 12a of the hold substrate 12 and alignment end 22, i.e., the amount of an alignment error, is d, and the length of the cantilever portion 16 is L when there is no misalignment. At this time, the spring constant k of the cantilever portion 16 obtained from the equation (1) is:

$$k = Et^3w/4(L+d)^3 \quad (3)$$

Further, the resonance frequency $\omega$ of the portion 16 obtained from the equation (2) is:

$$\omega = 0.162\,(E/\rho)^{\frac{1}{2}}t/(L+d)^2 \quad (4)$$

Similarly, the spring constant k of the cantilever 16 shown in FIG. 5 obtained from the equation (1) is:

$$k = Et^3w/4(L-d)^3 \quad (5)$$

Further, the resonance frequency $\omega$ of the portion 16 of FIG. 5 obtained from the equation (2) is:

$$\omega = 0.162(E/\rho)^{\frac{1}{2}}t/(L-d)^2 \quad (6)$$

Since in the cantilever chip according to this embodiment, the part of each cantilever portion which extends from the fixed end thereof to a point closer to the free end is bonded to the hold substrate 12, a crack caused in a cantilever portion at the time of breaking off the same will not adversely affect the other cantilever portions. That is, breaking off an unneeded cantilever portion will not change the characteristics of a cantilever to be used.

Figure 7:
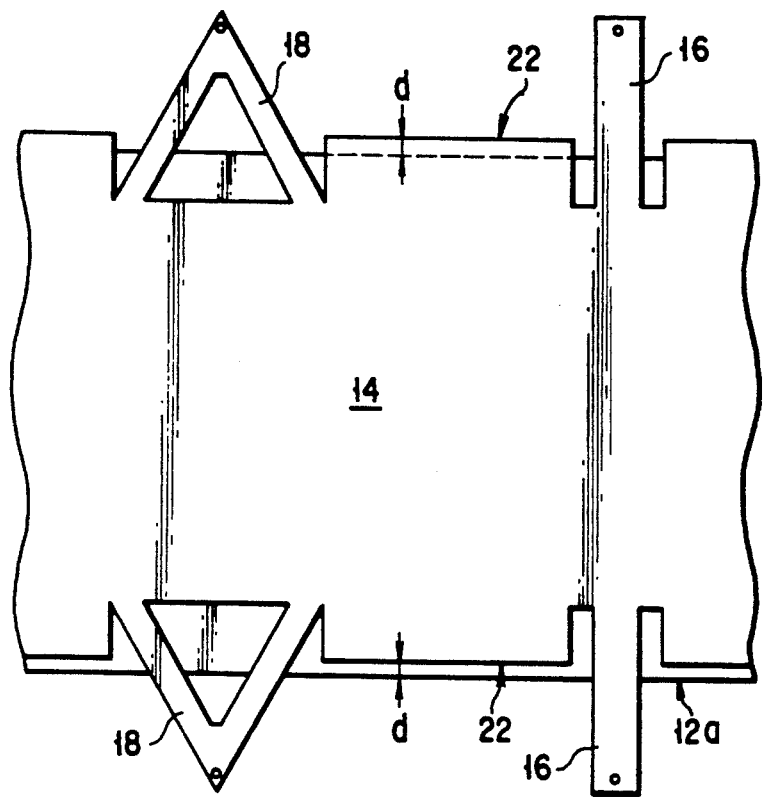
FIG. 7 shows both sides of the cantilever of FIG. 1, which are provided with cantilever portions, respectively.
Figure 8:
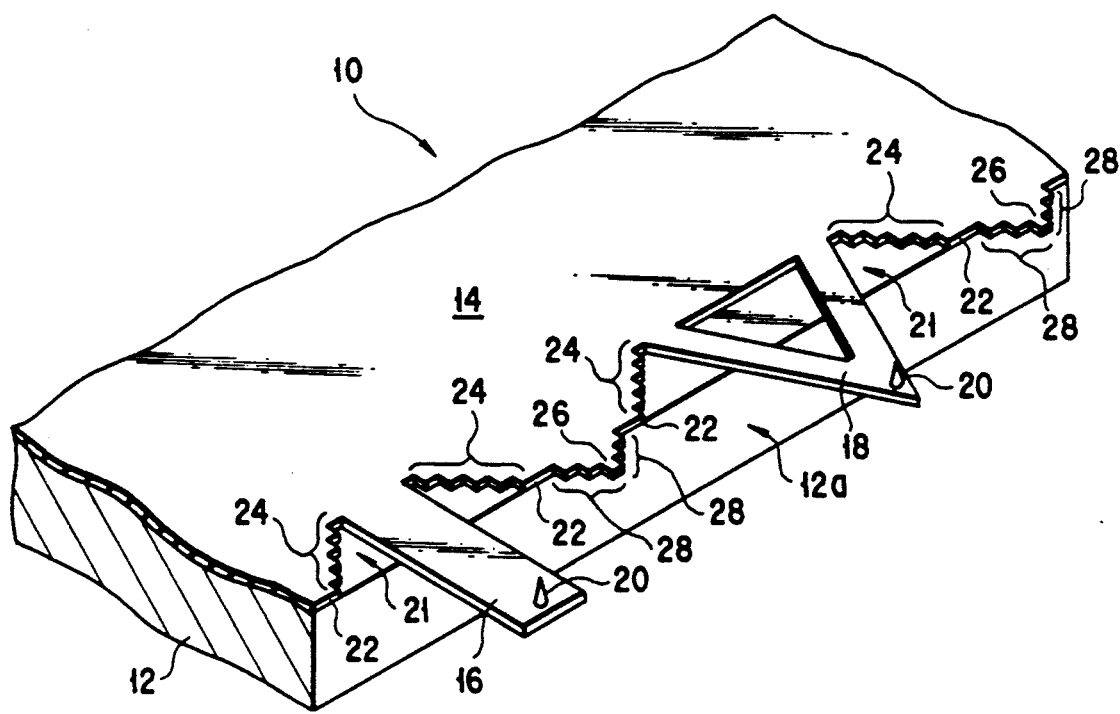
FIG. 8 shows a cantilever chip according to a second embodiment of the invention.

In manufacturing the above-described cantilever, in general, the film member 14 is provided with a plurality of cantilever portions on each side thereof, as is shown in FIG. 7. The film member 14 and hold substrate 12 have sizes which enable the alignment end 22 to be aligned with the side end face 12a on each side. Accordingly, if the alignment end 22 and side end face 12a are displaced from each other by a distance d, as is shown in FIG. 7, the cantilever portion on one side becomes shorter by the distance d than a designed value, and the cantilever portion on the other side becomes longer by the distance d than the same. In this case, the characteristics of the cantilever portion on each side are not greatly deviated from designed values. In other words, the rate of occurrence of bad cantilever chips which cannot be used is low. Viewed from another angle, the cantilever chips can be produced more easily since a small alignment error is allowable.

Then, a cantilever chip according to a second embodiment of the invention will be explained with reference to FIGS. 8 to 12. The cantilever chip of this embodiment is produced in the same manner as in the first embodiment, and is similar to that of the first embodiment except that the patterns of the film members 14 slightly differ from each other, as is evident from FIG. 8. Specifically, in the second embodiment, the film member 14 has structures 24 formed between the fixed ends of the cantilever portions 16 and 18 and the alignment end 22. The structure 24 has a periodical regular-pitch stepwise shape. The film member 14 further has a projection 26 projecting from the alignment end 22 and having edge portions of a periodical structure 28 similar to the structure 24.

Figure 9:
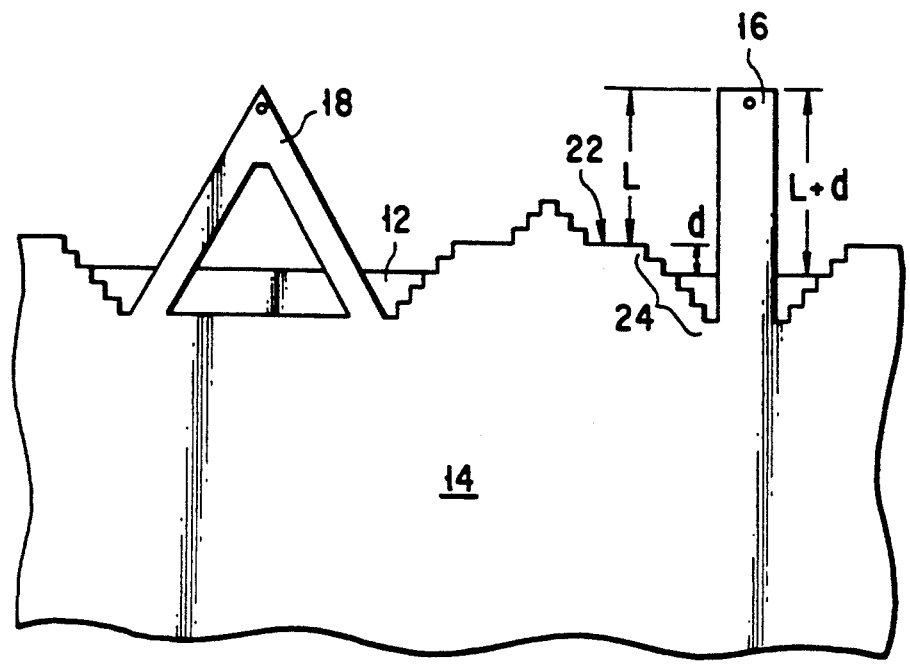
FIG. 9 is a plan view, showing an occasion where a cantilever portion of the cantilever chip of FIG. 8 is displaced in a direction in which it is lengthened.
Figure 10:
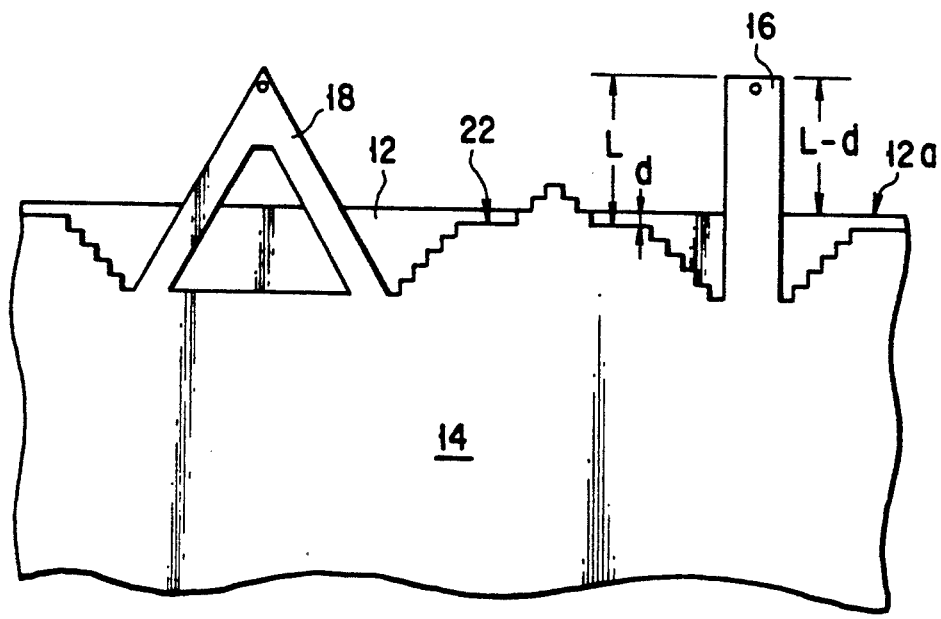
FIG. 10 is a plan view, showing an occasion where a cantilever portion of the cantilever chip of FIG. 8 is displaced in a direction in which it is shortened.

The cantilever chip of the second embodiment can provide the following advantages, as well as those obtained in the first embodiment. Since the film member 14 has the regular-pitch periodical structures 24 and 28, the amount d of an alignment error necessary to perform an amendment using the equations (3) to (6) can be easily obtained, when the alignment error occurs at the time of bonding the film member 14 to the hold substrate 12. It can be understood with ease that if the periodical structure has stepped portions of a pitch of 10 μm, the alignment error amount d of the cantilever shown in FIG. 9 is 20 μm, and that of the cantilever shown in FIG. 10 is 10 μm.

Figure 11:
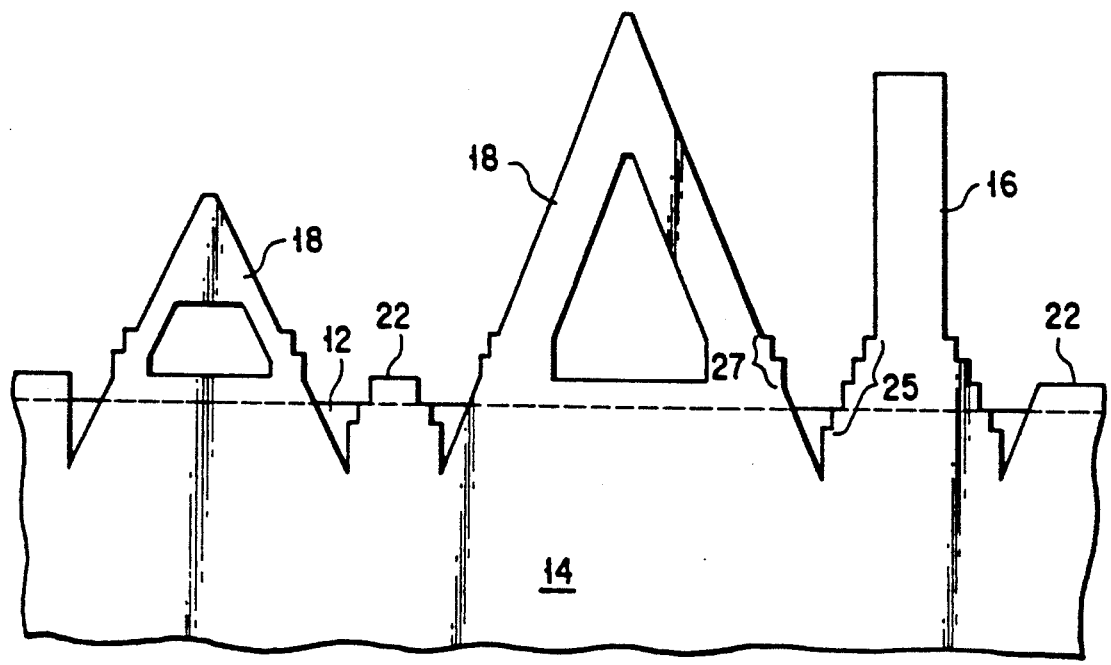
FIG. 11 shows a cantilever chip having a film member of a shape differing from that shown in FIG. 8.

Though in the second embodiment, the periodical structures are provided between the fixed end of the cantilever portion and the alignment end, and at the projection, the invention may be modified such that periodical structures 25 and 27 are provided at the cantilever portions 16 and 18, respectively, as shown in FIG. 11.

Figure 12:
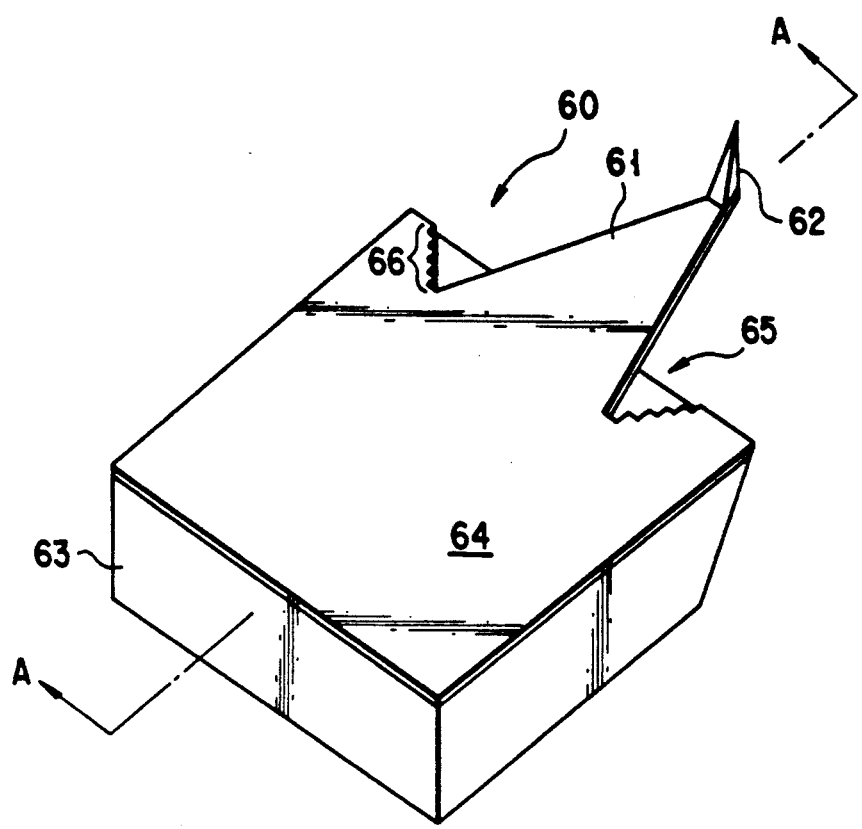
FIG. 12 shows a cantilever chip according to a third embodiment of the invention.
Figure 13:
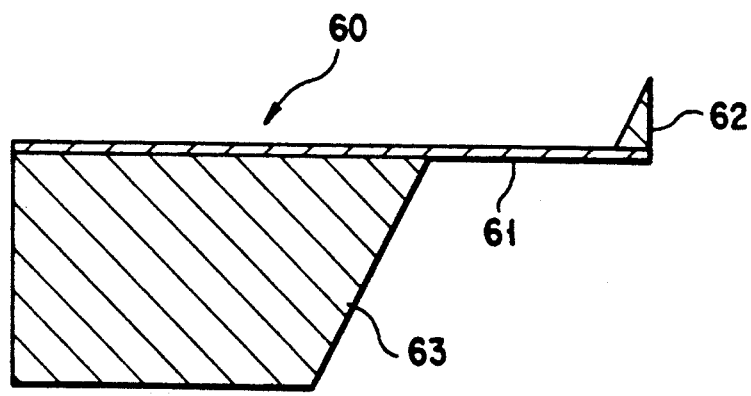
FIG. 13 is a cross sectional view, taken along line A—A in FIG. 12.

A cantilever chip according to a third embodiment of the invention will be explained. As is shown in FIGS. 12 and 13, a cantilever chip 60 has a hold substrate 63 and a film member 64 formed on the substrate 63. The film member 64 has a projecting triangular cantilever portion 61. The cantilever portion 61 has a triangular pyramid-shaped probe portion 62 at its tip. Notches 65 are formed at the opposite ends of the root of the cantilever portion 61. A stepwise periodical structure 66 having stepped portions of a regular pitch is provided at each edge of the notch 65. The side of the cantilever portion 61 opposite to the side provided with the probe portion is coated with a film for reflecting light as occasions command.

Figure 14:
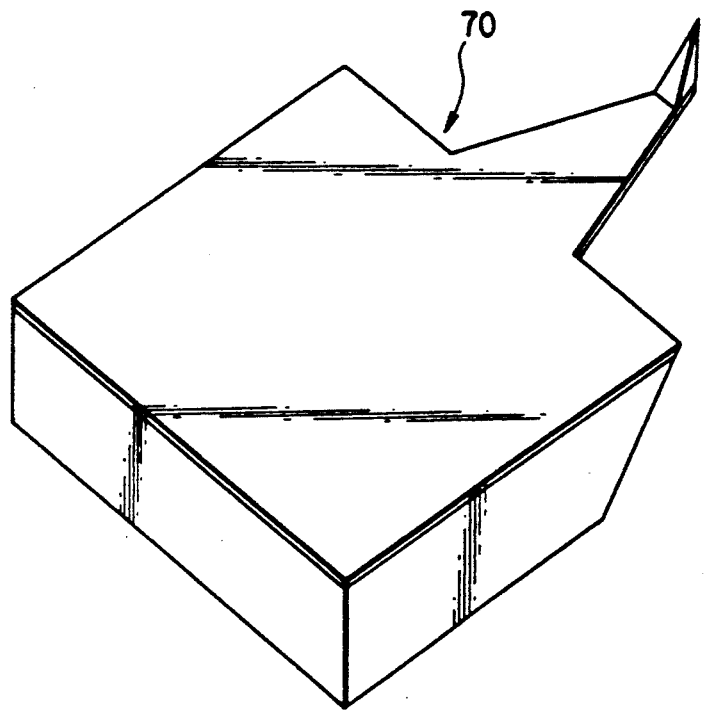
FIG. 14 shows a conventional cantilever chip.

The cantilever chip 60 of the third embodiment is characterized by the notches 65. A cantilever chip 70 with no notches (FIG. 14), which is produced in an applied semiconductor IC process, has been proposed by the inventors of the present invention. The cantilever chip 60 is produced by modifying a mask pattern used in the process. A method of producing the cantilever chip 60 of the third embodiment will now be explained. First, referring to FIGS. 15A to 15I, a process of producing the cantilever chip 70 in FIG. 14 will be explained, and thereafter, a process of modifying a mask pattern used in the process shown in FIGS. 15A to 15I so as to obtain the cantilever chip 60 will be described.

Figure 15A:
FIGS. 15A to 15I are views, useful in explaining a method of manufacturing the cantilever chip of FIG. 14.
Figure 15B:
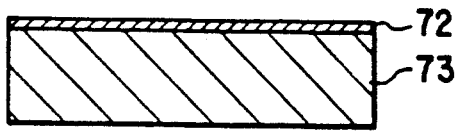

As is shown in FIG. 15A, an undoped silicon wafer 73 having a plane orientation (100) and a thickness of 525 μm is prepared. Then, as is shown in FIG. 15B, the major surface of the silicon wafer 73 is doped with boron (B) of a high density of $10^{20}$ ions/cm$^3$, thereby forming a boron-doped layer 72 of a thickness of approx. 600 nm. Boron doping is performed by e.g. ion implantation.

Figure 15C:
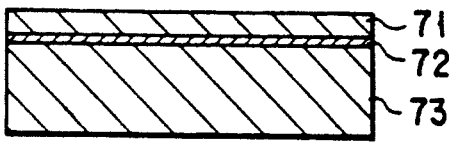

Thereafter, the resultant wafer is subjected to annealing, and then silicon is epitaxially grown on the boron-doped layer 72, thereby forming an undoped silicon layer 71 of a thickness of approx. 5 μm (FIG. 15C).

Figure 15D:
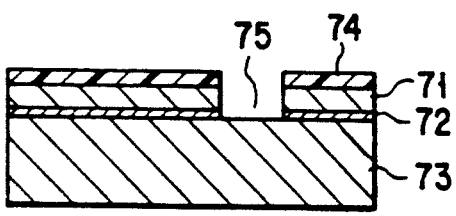

Subsequently, the silicon layer 71 is coated with a resist layer 74, and an opening having the same shape as an opening 75 shown in FIG. 16 is formed in the resist layer 74 by patterning. Using the resist layer 74 as a mask, reactive etching is performed by use of a ($SF_6+C_2BrF_5$) gas until that portion of the silicon wafer 73 which corresponds to the opening 75 is exposed, thereby forming the opening 75 (FIG. 15D).

Figure 15E:
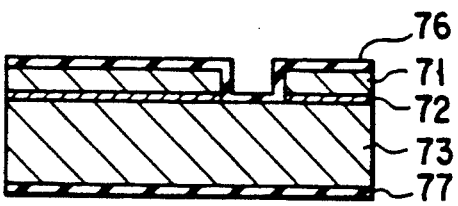
Figure 15F:
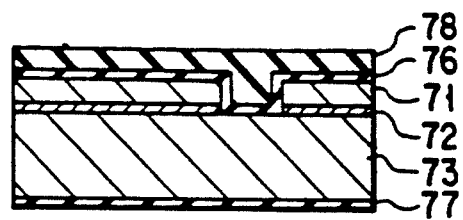

After removing the resist layer 74, the resultant wafer is subjected to heat treatment, thereby forming a silicon oxide film 76 on the upper surface thereof (and also on the inner surface of the opening 75), and a silicon oxide film 77 on the lower surface (FIG. 15E). Then, the silicon oxide film 76 is coated with an SOG film 78, and the surface of the film 78 is flattened (FIG. 15F). The main component of the SOG film 78 is a silicon oxide where the film is hardened.

Figure 15G:
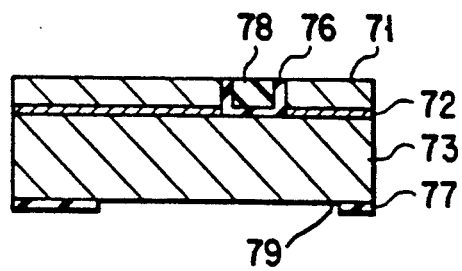

The oxide film 76 and SOG film 78 are removed by plasma dry etching, except for those portions of the films which fill the opening 75. Then, a rectangular opening 79 is formed by patterning the silicon oxide film 77 (FIG. 15G).

Figure 15H:
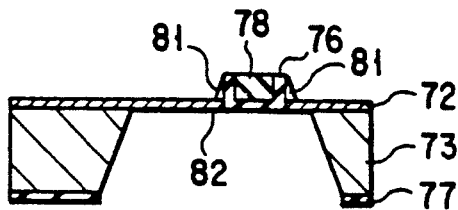
Figure 15I:
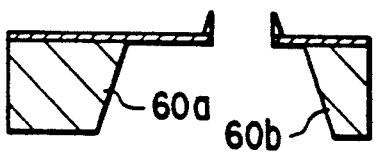

Wet anisotropic etching is performed to the silicon wafer 73 and silicon layer 71, using an aqueous solution of potassium hydroxide. At the time of performing wet anisotropic etching, the silicon oxide film 77 serves as a mask, and the boron-doped layer 72 and silicon oxide film 76 serve as etching preventing layers. As a result, tetrahedral probe portions 81 and a membrane 82 are formed (FIG. 15H).

Finally, the remaining silicon oxide film 76 and SOG film 78 are removed by use of buffered hydrofluoric acid (FIG. 15I), thereby obtaining the cantilever chip 70 in FIG. 11.

To form the cantilever of the third embodiment shown in FIG. 12, it is necessary to form an opening as shown in FIG. 17 in the process shown in FIG. 15D, instead of the opening shown in FIG. 16.

It is desirable to align an alignment end 88 with the edge 83 of the membrane 82, to form the opening 75 shown in FIG. 17 in the resist layer 74. In reality, however, they are more or less displaced from each other due to misalignment. In the mask pattern shown in FIG. 17, the fixed end of a triangular portion 90 is retreated from the alignment end 88, and hence the shape of the cantilever portion 61 does not greatly changed even if the alignment end 88 is displaced from the edge 83 of the membrane 82, thereby minimizing the amounts of errors in characteristics such as a spring constant and a resonance frequency.

A cantilever chip according to a fourth embodiment of the invention will be explained. As is shown in FIG. 18, a cantilever chip 100 has a hold substrate 102 and a film member 104 bonded to the substrate. The film member 104 has a cantilever portion 106 provided with a probe portion 108 at its tip. The cantilever portion 106 has notches 110 at its root. Stepwise periodical structures 112 are formed at the portions of the film member 104 which define the notches, and a film 114 is formed on the lower surface of the substrate 102.

Figure 19A:
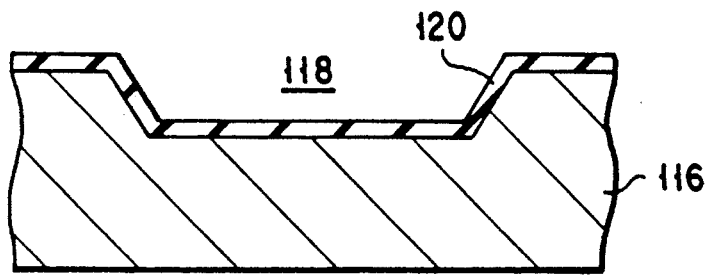
FIGS. 19A to 19D are views, useful in explaining a method of manufacturing the cantilever chip of FIG. 18.
Figure 19B:
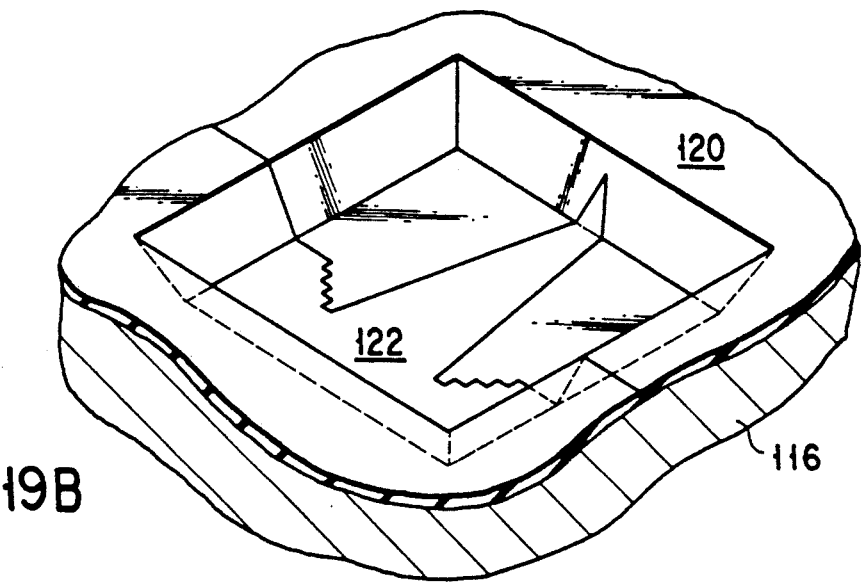
Figure 19C:
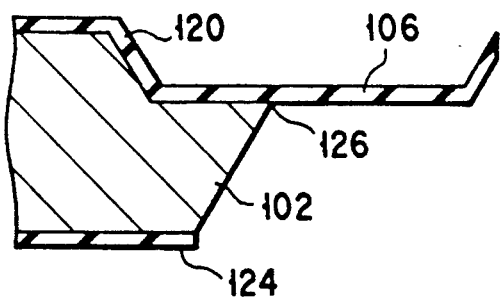

A method of forming the cantilever portion 100 will be explained referring to FIGS. 19A to 19D. First, a silicon wafer 116 of a plane orientation (100) is prepared, and then wet anisotropic etching is performed to the upper surface of the wafer, thereby forming a rectangular depression 118 therein, oxidizing the etched surface to form a silicon oxide film 120 (FIG. 19A). A mask pattern 122 having a shape as shown in FIG. 19B is formed on the silicon oxide film 120. Subsequently, a silicon oxide film 124 is formed on the lower surface of the wafer 116, and then is patterned to a predetermined shape. The wafer 116 is subjected to wet anisotropic etching, using the patterned film 124 as a mask, obtaining the cantilever chip 100 shown in FIG. 12 (FIG. 19C).

Figure 19D:
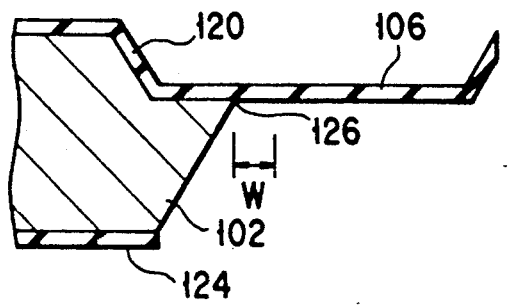

As regards the patterning of the silicon oxide film 124 formed on the lower surface of the wafer 116, it is desirable that when the hold substrate 102 is formed by etching the wafer 116, the edge 126 of the substrate 102 is located at the center of the periodical structure 112. The edge 126 is liable to be displaced from a desired location due to misalignment of a mask used at the time of patterning of the film 124 or due to variations in the thickness of the wafer 116. Supposing that the edge 126 of the cantilever chip of FIG. 19C is formed to accord with a designed value, that of the chip of FIG. 19D is displaced by W from the designed value. Accordingly, the cantilever portion 106 in FIG. 19D is longer by W than a designed value. The amount of the displacement of the edge 126 can be easily measured by observing the cantilever chip from above and checking the edge 126 with the periodical structure 112.

Figure 20:
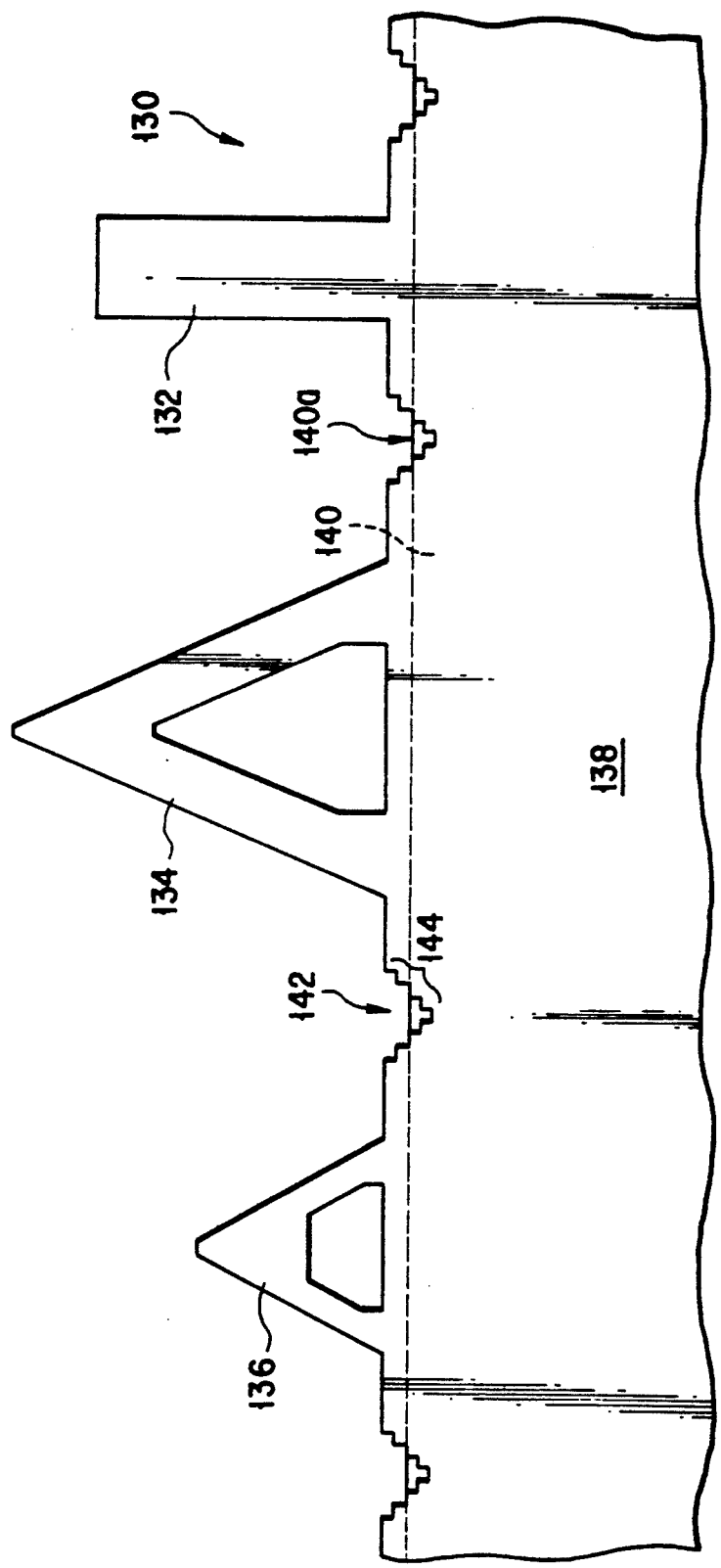
FIG. 20 shows a cantilever chip according to a fifth embodiment of the invention.

A cantilever chip according to a fifth embodiment of the invention will be explained. The cantilever chip of this embodiment is manufactured by the same method as used in the first embodiment. As is shown in FIG. 20, a cantilever chip 130 has a film member 138 with a plurality of cantilever portions 132, 134, and 136. Notches 142 are formed between each adjacent pair of the cantilever portions 132, 134, and 136. Each notch has edges with regular-pitch stepwise periodical structures 144. The film member 138 is bonded to a hold substrate 140 by anode bonding. The anode bonding is performed, with the side end face 140a of the hold substrate 140 aligned with a middle portion of the periodical structure 144.

Figure 21:
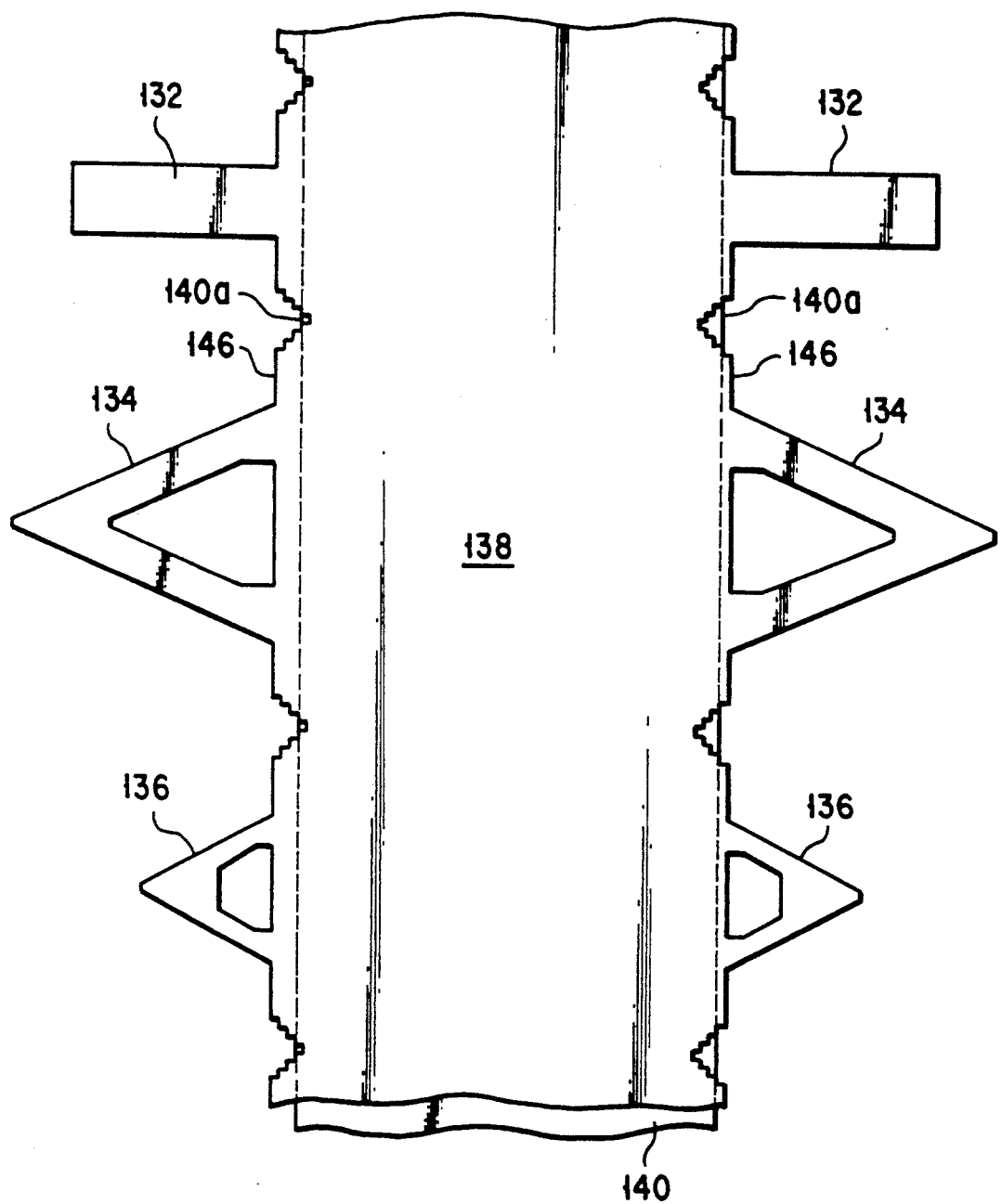
FIG. 21 shows both sides of the cantilever of FIG. 18, which are provided with cantilever portions, respectively.
Figure 22:
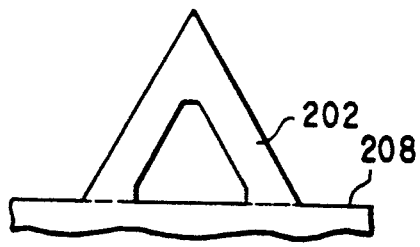
FIG. 22 is a plan view showing a conventional cantilever chip.
Figure 23:
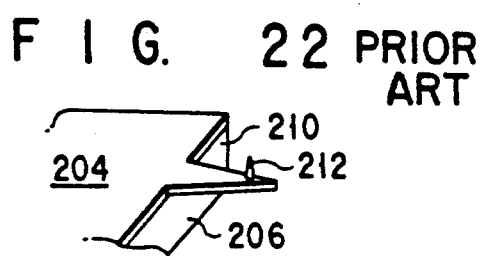
FIG. 23 is a perspective view of the cantilever chip of FIG. 22.
Figure 26:
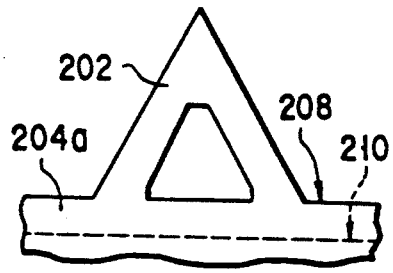
FIG. 26 is a plan view of the cantilever chip of FIG. 22, taken when misalignment occurs.
Figure 24:
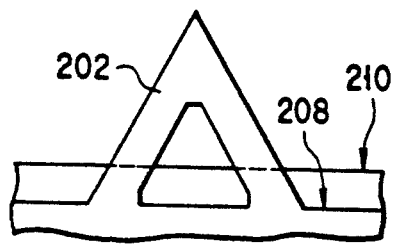
FIG. 24 is a plan view of the cantilever chip of FIG. 22, taken when misalignment occurs.
Figure 27:
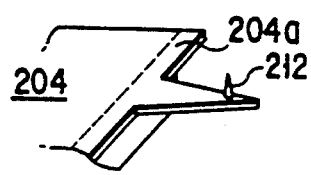
FIG. 27 is a perspective view of the cantilever of FIG. 6.
Figure 25:
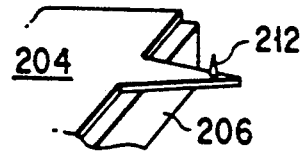
FIG. 25 is a perspective view of the cantilever chip of FIG. 24.
Figure 28:
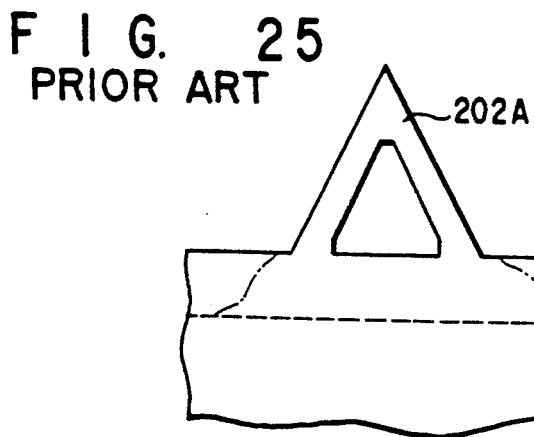
FIG. 28 is a view, showing cracks caused when an unneeded cantilever portion of the cantilever shown in FIGS. 26 and 27 is broken off.

As is shown in FIG. 21, and as is described in the first embodiment, it is preferable to attach to the hold substrate 140 the film member 138 having the cantilever portions 132, 134, and 136 formed on each side thereof such that cantilever portions of the same shape are opposed to each other. In this embodiment, however, the width of the hold substrate 140. i.e., the distance between the opposite side end faces 140a is narrower than the distance between the opposite parallel linear portions 146 of the film member 138.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

We claim:

1. A cantilever chip for use in a scanning probe microscope, comprising:
   a hold substrate having a side end face; and
   a film member bonded to the substrate and having:
      a cantilever portion,
      an alignment end used as a mark to determine the position of the side end face of the substrate with respect to the film member, and
      notches, scribed at a position overlying the side end face of said substrate, separating the cantilever portion from the alignment end, the cantilever portion having a projection projecting from the side end face of the substrate, a fixed end fixed to the substrate, and a free end with a probe.

2. The cantilever chip according to claim 1, wherein the film member comprises scale means for measuring an alignment error between the alignment end and the side end of the hold substrate.

3. The cantilever chip according to claim 2, wherein the scale means has a regular periodical structure.

4. The cantilever chip according to claim 3, wherein the periodical structure extends from the fixed end of the cantilever portion to the alignment end.

5. The cantilever chip according to claim 3, wherein the film member further has a projection projecting from the alignment end, and the periodical structure is provided also at the projection.

6. The cantilever chip according to claim 3, wherein the periodical structure is provided at the cantilever portion.

7. A cantilever chip for use in a scanning probe microscope, comprising:
 a hold substrate having a side end face; and
 a film member bonded to the substrate and having:
  a plurality of cantilever portions arranged at least on one side of the film member,
  an alignment end used as a mark to determine the position of the side end face of the substrate with respect to the film member, and
  notches, scribed at positions overlying the side end face of said substrate, for separating the cantilever portions from each other, the cantilever portions each having a projection projecting from the side end face of the substrate, a fixed end fixed to the substrate, and a free end with a probe.

8. The cantilever chip according to claim 7, wherein the film member further has scale means for measuring an alignment error between the cantilever portion and the side end face of the hold substrate.

9. The cantilever chip according to claim 8, wherein the scale means has a regular periodical structure.

10. The cantilever chip according to claim 9, wherein the periodical structure extends from the fixed end of the cantilever portion to the alignment end.

11. The cantilever chip according to claim 10, wherein the film member further has a projection projecting from the alignment end, and the periodical structure is provided also at the projection.

12. The cantilever chip according to claim 9, wherein the periodical structure is provided at the cantilever portion.

* * * * *